United States Patent [19]

Fulton et al.

[11] 4,188,004
[45] Feb. 12, 1980

[54] CABLE TIE MOUNT AND TIE FOR USE THEREWITH

[75] Inventors: Ronald T. Fulton, Tinley Park; Roy A. Moody, Flossmoor, both of Ill.

[73] Assignee: Panduit Corp., Tinley Park, Ill.

[21] Appl. No.: 950,768

[22] Filed: Oct. 12, 1978

[51] Int. Cl.² ............................................. F16L 3/08
[52] U.S. Cl. ............................ 248/74 PB; 24/73 PB
[58] Field of Search ............... 248/74 A, 73, 68 R, 248/68 CB, 74 B, 74 PB, 74 R; 24/73 PB, 201 A, 16 PB

[56] References Cited

U.S. PATENT DOCUMENTS

| | | | |
|---|---|---|---|
| 3,149,808 | 9/1964 | Weckesser | 248/74 PB |
| 3,463,427 | 8/1969 | Fisher | 248/68 R |
| 3,588,011 | 6/1971 | Peres | 248/74 A X |
| 3,588,964 | 6/1971 | Dudley et al. | 248/74 PB |
| 3,631,572 | 1/1972 | Lange | 24/201 A X |
| 3,632,069 | 1/1972 | Thayer | 248/68 R X |
| 3,632,070 | 1/1972 | Thayer | 248/74 PB X |
| 3,672,615 | 6/1972 | Florentino | 24/73 |
| 3,819,139 | 6/1974 | Jemison | 24/73 PB X |
| 3,913,876 | 10/1975 | McSherry | 248/74 PB |
| 4,128,220 | 12/1968 | McNeel | 24/73 PB X |

FOREIGN PATENT DOCUMENTS 587083 10/1933 Fed. Rep. of Germany ........ 248/68 R

*Primary Examiner*—J. Franklin Foss
*Attorney, Agent, or Firm*—Charles R. Wentzel; Richard B. Wakely

[57] ABSTRACT

A combination of a cable tie mount and a cable tie for forming a plurality of wires into a bundle and for mounting the bundle on a support surface. The tie includes an elongate strap and a locking head joined to one end of the strap for receiving the free end of the strap to encircle the wires. The mount has a base adapted to be secured to the support surface. The tie and mount have components comprising means for securely holding the tie to the mount prior to the locking head receiving the free end of the strap. No part of the mount is encircled with the bundle by the strap and the locking head whereby the mount, securely holding the tie, can be secured to the support surface prior to association of the wires with the tie and whereby the shape of the bundle is not distorted due to the presence of components of the mount being included with the bundle.

12 Claims, 6 Drawing Figures

CABLE TIE MOUNT AND TIE FOR USE THEREWITH

BACKGROUND

The present invention relates to mounts and more specifically to a mount for use with a cable tie for securing a bundle of wires to a support.

Over the years many types of mounting devices have been used for holding one or more elongate objects, such as a hose or a plurality of wires, to a support. One of the more popular devices for use in vehicles such as airplanes or automobiles has been the "P" clamp which includes a generally circular portion each end of which terminates in a generally flat foot portion. After the items to be held are encircled by the circular portion, the feet are overlapped until apertures in the feet are aligned to receive a threaded fastener. Such clamps are generally not adjustable so that when they are used in an environment where many different sizes of bundles have to be accommodated, a large inventory of different size clamps must be maintained. Also it is difficult to achieve a predetermined tension on the held objects and it is sometimes necessary to use wedges or other fillers to cause the encircled objects to be subjected to any compressive forces.

In the last decade cable ties have been widely accepted for forming several wires into a bundle and more generally for holding a pair of objects together either in side-by-side or telescopic relationship. Such a tie is shown in commonly assigned U.S. Pat. No. 3,872,547. Discrete mounts have been proposed for use with cable ties and this combination is often preferable to a "P" clamp since the cable tie is adjustable and can easily be tensioned to a desired level. A common feature of such mounts is that part of the mount is encircled with the bundle which can, depending on the number and size of the wire to be held, result in the bundle deviating to some extent from the desired circular cross-sectional configuration. One type of cable tie mount comprises a flat base for attachment to the support and from which extends a bridge structure for temporarily holding the cable tie head and defining an opening for receiving the free end of the strap to guide it into the locking head. In another type of mount, a shank, which is sized for reception in an aperture in a wall, includes a window for receiving the cable tie strap. The shank terminates in an enlarged head for abutting the wall. A limitation of such a mount is that both sides of the support wall must be accessible. Reference may be made to U.S. Pat. Nos. 3,542,321; 3,621,751; 3,672,615; and 3,913,876.

SUMMARY OF THE INVENTION

Among the several objects of the present invention may be noted the provision of an improved cable tie mount which securely holds a cable tie prior to threading of the cable tie strap into the cable tie locking head; the provision of such a mount which permits the tie to be fastened about a bundle of wires prior to association of the tie and mount thereby avoiding distortion of the desired circular cross-sectional bundle configuration; the provision of such a mount which generally permanently secures the tie on the mount without the use of a tool and which is compatible with existing cable ties; and the provision of such mount which is unitary construction, has long service life and is simple and economical to manufacture. Other objects and features of the present invention will be in part apparent and in part pointed out in the following specification and in the claims attendant thereto.

Briefly, the combination of the present invention includes a tie having an elongate strap and a locking head joined to one end of the strap for receiving the other end of the strap. The combination also includes a cable tie mount having a base adapted to be secured to a support surface. The tie and mount comprise means for securely holding the tie to the mount before the locking head eeceives the other end of the strap. No part of the mount is encircled with the bundle by the strap and the locking head.

BRIEF DESCRIPTION OF THE DRAWINGS

Corresponding reference characters indicate corresponding components throughout the several views of the drawings.

DESCRIPTION OF THE PREFERRED EMBODIMENT

Figure 1:
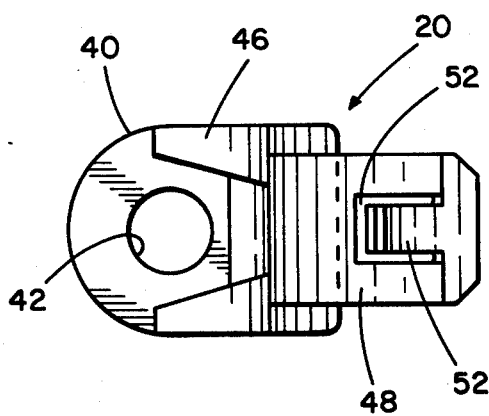
FIG. 1 is a plan of the mount of the present invention comprising a base from which extends a mounting tongue having a locking tooth for engaging the head of the cable tie.
Figure 2:
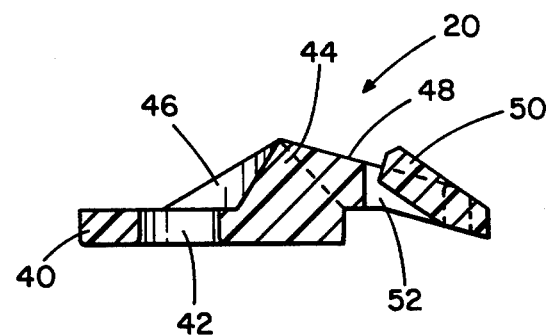
FIG. 2 is a cross-sectional view of the mount of FIG. 1.
Figure 3:
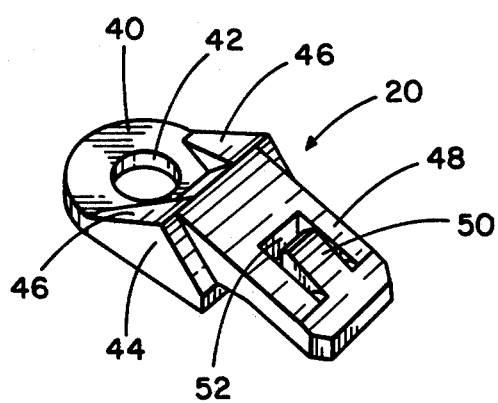
FIG. 3 is a perspective view of the mount of FIG. 1.
Figure 4:
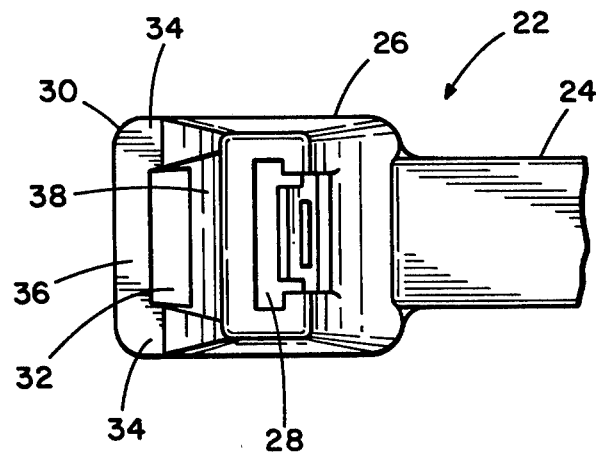
FIG. 4 is an enlarged plan of the head portion of a cable tie for use with the mount.

Referring now to the drawings, a cable tie mount of the present invention is generally indicated in FIGS. 1–3 by reference numeral 20. Mount 20 is intended for use in holding a cable tie 22 which is shown, with certain components removed, in FIGS. 4–6. Such a tie is useful for forming a plurality of elongate objects, such as wires, into a bundle. Cable tie 22 is fully shown and described in commonly assigned U.S. Pat. No. 3,731,347, the teachings of which are incorporated herein by reference.

Briefly, cable tie 22 is of one-piece molded thermoplastic construction and comprises a strap 24 extending from a locking head 26 having an aperture 28 for receiving the free end (not shown) of strap 24. Extending from head 26 opposite strap 24, in the as-molded condition of the tie, is a frame 30 which defines with head 26 an opening 32 which can be used to receive the excess threaded portion of the strap and hold it adjacent the bundle. More specifically, frame 30 includes spaced side walls 34 extending from head 26 in the longitudinal direction of the strap as-molded with an end wall 36 joining the outer ends of the side walls. Locking head 26 includes an inclined guide surface 38 facing end wall 36.

Figure 6:
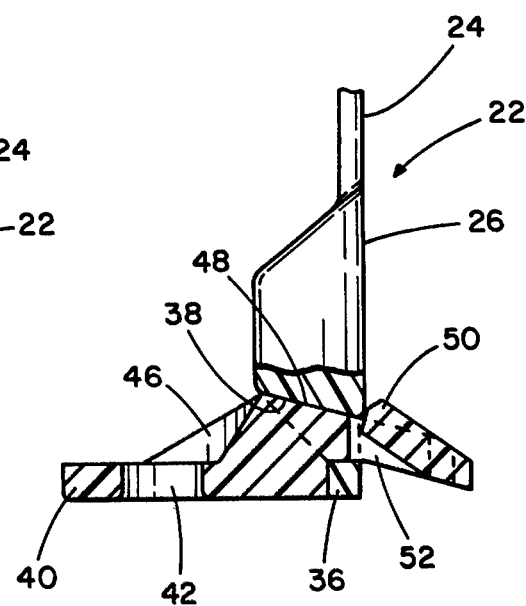
FIG. 6, similar to FIG. 5, shows the tie held by the mount.

Referring to FIGS. 1–3, mount 20 includes a generally flat base 40 having an aperture 42 for receiving a threaded fastener to secure the mount on a support surface. Extending upwardly from the base is a ledge 44 with the ledge and base joined by a pair of spaced reinforcing ribs 46. Mount 20 also comprises a tongue 48, extending from ledge 44 away from base 40 and toward the support surface, for reception within opening 32 to hold the tie to the mount. Thus frame 30 of the cable tie and tongue 48 constitute means for securely holding the tie to the mount. As shown in FIG. 6, when the tie is mounted and the mount secured to the support surface, frame end wall 36 is held between tongue 48 and the support surface. Preferably, the spacing between the free end of the tongue and the support surface is less than the thickness of end wall 36 so that the end wall is prevented from escaping from under the tongue.

Mount 20 also includes retaining means for, once tongue 48 is received within opening 32, locking the tie to the mount. For this purpose, mount 20 comprises a resilient tooth 50 generally disposed within an aperture 52 in tongue 48. Pointed out with greater particularity, tooth 50 is deflectable and extends from adjacent the free end of the tongue into aperture 52. Part of the tooth extends outside the aperture and above the level of the aperture.

Prior art cable tie mounts only temporarily hold the cable tie before the tie is fixed around the bundle. After the free end of the strap is threaded into the locking head, the tie is permanently held since a part of the mount is encircled with the bundle. With the cable tie mount of the present invention, the tie can be permanently secured to the mount prior to the strap being threaded and no part of the mount is encircled by the strap. Thus, mount 20 is suitable for use in applications where it is desirable to have the tie held by the mount which is in turn secured to the support surface prior to association of the wires to be held with the tie. Conversely, the combination of mount 20 and tie 22 permits the tie to permanently form the objects into a bundle prior to association of the tie and mount.

Figure 5:
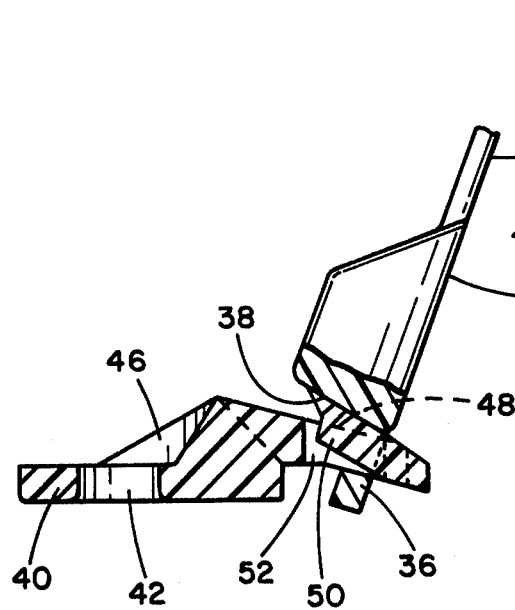
FIG. 5 is a side view showing the tie being seated on the mount with certain components of the tie and mount shown in section.

Operation of the mount of the present invention is as follows: The free end of tongue 48 is inserted into opening 32 with tooth 50 engaging guide surface 38 as shown in FIG. 5. As the tongue is forced further into the opening, tooth 50 is deflected somewhat into aperture 52. Once the locking head passes tooth 50, the tooth due to its resiliency again extends out of the aperture to engage the locking head and retain the tie on the mount. Thereafter, the mount can be secured to the support surface. It will be appreciated that facing surfaces of the mount and tie are shaped and inclined complimentary so that, as shown in FIG. 6, the tie and mount form a generally solid mass.

Mount 20 is preferably of unitary molded thermoplastic construction. It should be noted that due to the relatively slight inclination of guide surface 38 and the extension of tooth 50 as a cantilever beam, the surface and tooth provide a force amplification system permitting the tie to be mounted without the use of tools. However, once the tie is seated on the mount it can be removed only with great difficulty and with the use of tools, e.g., a pliers. The provision of the tooth in addition to the close proximity of the free end of tongue 48 to the support surface provide a double retention feature for even if tooth 50 is somehow broken, frame end wall 36 remains trapped between the tongue and the support surface.

In view of the above, it will be seen that the several objects of the invention are achieved and other advantageous results are attained.

As various changes could be made in the above construction without departing from the scope of the invention, it is intended that all matter contained in the above description shall be interpreted as illustrative and not in a limiting sense.

What is claimed is:

1. A mount for securing objects formed into a bundle by a cable tie to a support surface, said tie including a strap extending from a locking head which receives the free end of the strap and further including a frame extending from the locking head opposite the bundle and defining an opening, said mount comprising
   a base adapted to be secured to said support surface;
   a tongue extending from said base for reception into said opening; and
   means for locking said tongue in said opening whereby said cable tie can be locked to said mount and the mount secured to said support surface prior to association of the tie and the objects and whereby no part of said mount is encircled by said strap.

2. The mount as set forth in claim 1 which is of one-piece molded thermoplastic construction.

3. The combination of a cable tie mount and a self-locking cable tie non-integral with said mount for forming a plurality of wires into a bundle and for mounting the bundle on a support surface; said tie comprising an elongate strap and a locking head joined to one end of said strap for receiving the other end of the strap to encircle said wires; said mount comprising a base adapted to be secured to said support surface; said tie and mount comprising means for securely holding said tie to said mount prior to the locking head receiving the other end of said strap, no part of said mount being encircled with said bundle by said strap and said locking head whereby said mount securely holding said tie can be secured to said support surface prior to association of said wires with said tie and whereby the shape of the bundle is not distorted due to the presence of components of said mount being included with said bundle.

4. The combination as set forth in claim 3 wherein said holding means comprises a frame defining an opening on one of said tie and mount, said holding means further comprising a tongue for reception within said opening on the other of said tie and mount.

5. The combination as set forth in claim 4 wherein said mount comprises retaining means for, once the tongue is received in the opening, retaining the tongue in the opening.

6. The combination as set forth in claim 4 wherein said cable tie is of molded thermoplastic construction and in its as-molded condition, said frame extends from said locking head opposite said strap, said frame comprising spaced side walls extending from said head generally in the longitudinal direction of the strap and further comprising an end wall joining the outer ends of said side walls, said walls and said locking head defining said opening.

7. The combination as set forth in claim 4 wherein said mount comprises a ledge extending upwardly from said base.

8. The combination as set forth in claim 7 wherein, with said mount secured to said support surface, said tongue extends from said ledge away from said base and toward said support surface.

9. The combination as set forth in claim 8 wherein a component of said frame is held between said tongue and said support surface, the spacing between the free end of said tongue and said support surface being less than the thickness of said component.

10. The combination as set forth in claim 7 wherein at least one reinforcing rib joins said ledge and said base.

11. The combination as set forth in claim 5 wherein said tongue includes an aperture and said retaining means comprises a deflectable tooth generally disposed within said aperture but extending partially outside said aperture, said tooth deflecting within said aperture as said tongue is received within said opening and engaging said locking head when said tie is seated on said mount.

12. The combination as set forth in claim 4 wherein facing surfaces of said mount and tie are shaped and inclined complimentary so that with said tie held by said mount, said mount and tie form a generally solid mass.

* * * * *